United States Patent
Mure et al.

(10) Patent No.: US 12,235,164 B2
(45) Date of Patent: Feb. 25, 2025

(54) TEMPERATURE MONITORING ASSEMBLY

(71) Applicants: Antonio Mure, Los Angeles, CA (US); Arturo Richi, Los Angeles, CA (US)

(72) Inventors: Antonio Mure, Los Angeles, CA (US); Arturo Richi, Los Angeles, CA (US)

( * ) Notice: Subject to any disclaimer, the term of this patent is extended or adjusted under 35 U.S.C. 154(b) by 463 days.

(21) Appl. No.: 17/714,633

(22) Filed: Apr. 6, 2022

(65) Prior Publication Data

US 2023/0324230 A1    Oct. 12, 2023

(51) Int. Cl.
*G01K 1/024* (2021.01)
*G01K 1/02* (2021.01)

(52) U.S. Cl.
CPC .............. *G01K 1/024* (2013.01); *G01K 1/026* (2013.01); *G01K 2207/02* (2013.01); *G01K 2207/04* (2013.01)

(58) Field of Classification Search
CPC .... G01K 1/024; G01K 1/026; G01K 2207/02; G01K 2207/04
See application file for complete search history.

(56) References Cited

U.S. PATENT DOCUMENTS

| | | | |
|---|---|---|---|
| 10,024,736 B2* | 7/2018 | Nivala | G01K 7/42 |
| 10,067,004 B1* | 9/2018 | Allen | G01K 13/00 |
| 10,909,979 B1* | 2/2021 | Chu | G08B 3/10 |
| D921,501 S* | 6/2021 | Wang | D10/57 |
| 2006/0032427 A1* | 2/2006 | Ishii | G01K 3/005 |
| | | | 374/E11.006 |
| 2015/0117136 A1* | 4/2015 | Eble | B01F 33/452 |
| | | | 366/142 |
| 2018/0120169 A1* | 5/2018 | Jackson | G06Q 10/00 |
| 2018/0143086 A1* | 5/2018 | Stoufer | A47J 37/1266 |
| 2019/0164117 A1* | 5/2019 | Wallace | H04L 12/2829 |
| 2019/0385115 A1* | 12/2019 | Biermann | G01K 1/024 |
| 2020/0069103 A1* | 3/2020 | Baldwin | A23L 5/13 |
| 2021/0048347 A1* | 2/2021 | Sitaraman | G01K 1/024 |
| 2021/0172805 A1* | 6/2021 | Cadima | F16B 2/10 |
| 2021/0192305 A1* | 6/2021 | Saenz | G06Q 10/08 |
| 2021/0231503 A1* | 7/2021 | Wu | G01K 1/024 |
| 2021/0264334 A1* | 8/2021 | Sirico | G06N 3/084 |
| 2021/0304222 A1* | 9/2021 | Gratianne | G06Q 50/12 |
| 2022/0107132 A1* | 4/2022 | Kobayashi | G05B 15/02 |
| 2022/0390285 A1* | 12/2022 | Parrott | G01K 1/024 |
| 2023/0115842 A1* | 4/2023 | Kim | G06F 17/40 |
| | | | 714/45 |

* cited by examiner

*Primary Examiner* — Nathaniel T Woodward
*Assistant Examiner* — Philip L Cotey (57) ABSTRACT

A temperature monitoring assembly includes a plurality of sensing units that each has an input port and each of the sensing units broadcasts a data signal. A first temperature sensor is pluggable into the input port on a respective one of the sensing units to sense the temperature of a fluid food item. A second temperature sensor has a data cord that is pluggable into the input port on a respective one of the sensing units to sense the temperature of a solid food item. A personal electronic device is included which stores a temperature analysis program. The personal electronic device is in remote communication with the sensing units and the personal electronic device displays temperature data corresponding to each of the sensing units to facilitate a user to remotely monitor the temperature of the food items that each of the sensing units is measuring.

8 Claims, 8 Drawing Sheets

Cooling Curve and Set Point of Control

| Temperature | Time |
|---|---|
| 155 | 0 |
| 150 | 10 |
| 146 | 20 |
| 140 | 30 |
| 135 | 36 |
| 131 | 42 |
| 126 | 48 |
| 121 | 54 |
| 117 | 60 |
| 112 | 66 |
| 107 | 72 |
| 102 | 78 |
| 98 | 84 |
| 93 | 90 |
| 88 | 96 |
| 84 | 102 |
| 79 | 108 |
| 74 | 114 |
| 70 | 120 |
| 65 | 160 |
| 60 | 200 |
| 55 | 240 |
| 51 | 280 |
| 46 | 320 |
| 41 | 360 |
|  |  |

TEMPERATURE MONITORING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to temperature monitoring devices and more particularly pertains to a new temperature monitoring assembly for monitoring food items as they cool in a refrigerated environment. The device includes a plurality of sensing units that are positioned in thermal communication with a food item that has been previously cooked and placed in a refrigerated environment. The device includes a personal electronic device that stores a temperature analysis program and which is in wireless communication with each of the sensing units. In this way a user can remotely monitor the temperature of the food item as it cools as well as receive alerts if the temperature of the food items is not in accordance with food safety regulations.

(2) Description of Related Art Including Information Disclosed Under 37 CFR 1.97 and 1.98

The prior art relates to temperature monitoring devices including a variety of wireless food thermometers that each broadcasts a detected temperature. The prior art discloses a wireless temperature monitoring system that includes a base unit and a temperature probe that is in wireless communication with the base unit to facilitate the base unit to display a temperature sensed by the temperature probe. The prior art discloses a wireless temperature monitoring device that includes a temperature probe which is in wireless communication with a voice activated artificial intelligence unit for facilitating a user to remotely monitor a temperature of a food item while the food item is being cooked. The prior art discloses a system and method of programming wireless sensor tags without the use of a computing device or personal electronic device. The prior art discloses a computing device and method for optimizing a processing chain of a food factory.

BRIEF SUMMARY OF THE INVENTION

An embodiment of the disclosure meets the needs presented above by generally comprising a plurality of sensing units that each has an input port and each of the sensing units broadcasts a data signal. A first temperature sensor is pluggable into the input port on a respective one of the sensing units to sense the temperature of a fluid food item. A second temperature sensor has a data cord that is pluggable into the input port on a respective one of the sensing units to sense the temperature of a solid food item. A personal electronic device is included which stores a temperature analysis program. The personal electronic device is in remote communication with the sensing units and the personal electronic device displays temperature data corresponding to each of the sensing units to facilitate a user to remotely monitor the temperature of the food items that each of the sensing units is measuring.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 10 thereof, a new temperature monitoring assembly embodying the principles and concepts of an embodiment of the disclosure and generally designated by the reference numeral 10 will be described.

As best illustrated in FIGS. 1 through 10, the temperature monitoring assembly generally comprises a plurality of sensing units 12 that is each assigned a unique identification with respect to each other. Each of the sensing units 12 has a bar code 14 that is printed on an outside of the sensing units 12 which corresponds to the unique identification. As is most clearly shown in FIG. 2, the bar code 14 may comprise a QR code or other similar type of graphical code that can be scanned with a personal electronic device, such as a smart phone for example. Each the sensing units 12 has an input port 16 and each of the sensing units 12 broadcasts a data signal.

Figure 1:
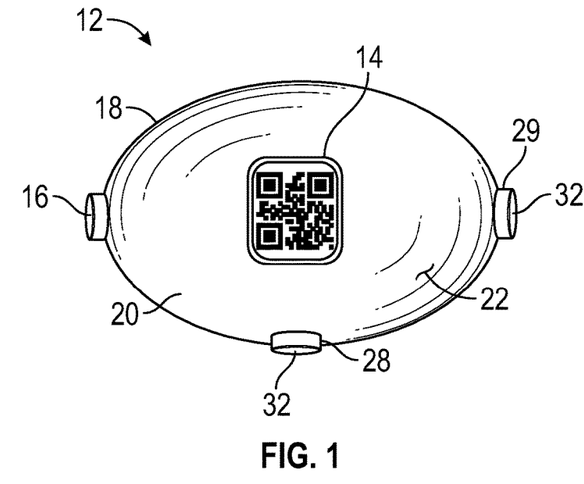
FIG. 1 is a front view of a sensing unit of an embodiment of the disclosure.

Each of the sensing units 12 comprises a housing 18 that has an outer wall 20 and the outer wall 20 is continuously arcuate about a central axis of the housing 18 such that the housing 18 has a rounded shape. Moreover, the housing 18 is elongated along the central axis such that the housing 18 has an ovoid shape. The bar code 14 is printed on an outer surface 22 of the outer wall 20 and the input port 16 is integrated into the outer wall 20. The input port 16 may comprise a universal serial bus port or other type of data port that is common to personal electronic devices such as smart phones or the like.

Figure 10:
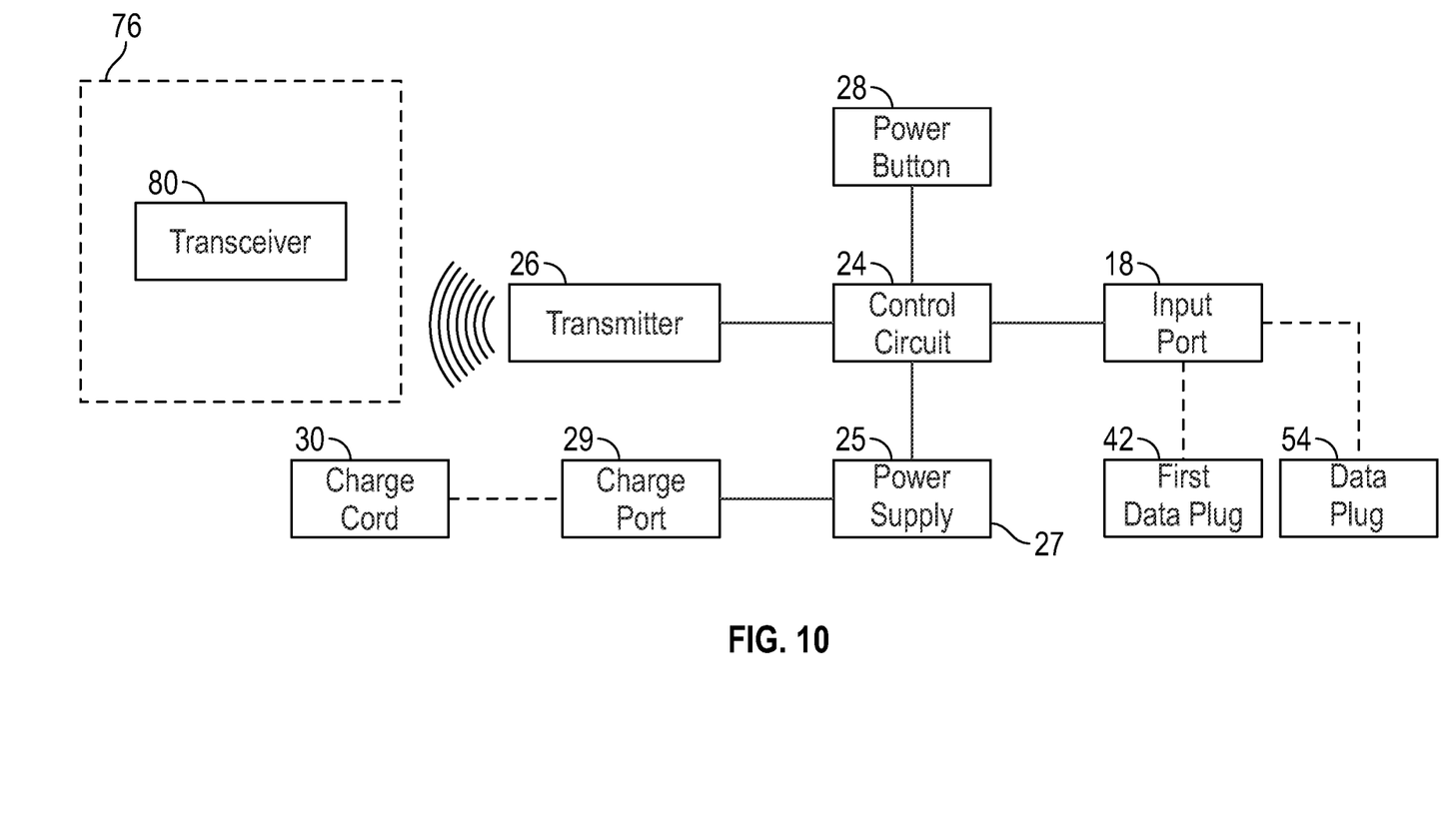
FIG. 10 is a schematic view of an embodiment of the disclosure.

Each of the sensing units 12 includes a control circuit 24 that is positioned within the housing 18 and the control circuit 24 is electrically coupled to the input port 16. Additionally, each of the sensing units 12 includes a transmitter 26 that is positioned within the housing 18. The transmitter 26 is electrically coupled to the control circuit 24 and the transmitter 26 broadcasting the data signal. Furthermore, the transmitter 26 may comprise a radio frequency transmitter or the like and the transmitter 26 may employ Bluetooth communication protocols. The control circuit may include circuitry of a Nordic NRF52832 which is manufactured by Nordic Semiconductor, Inc, 19925 Stevens Creek Blvd, Suite 100, Cupertino CA, 95014.

Figure 3:
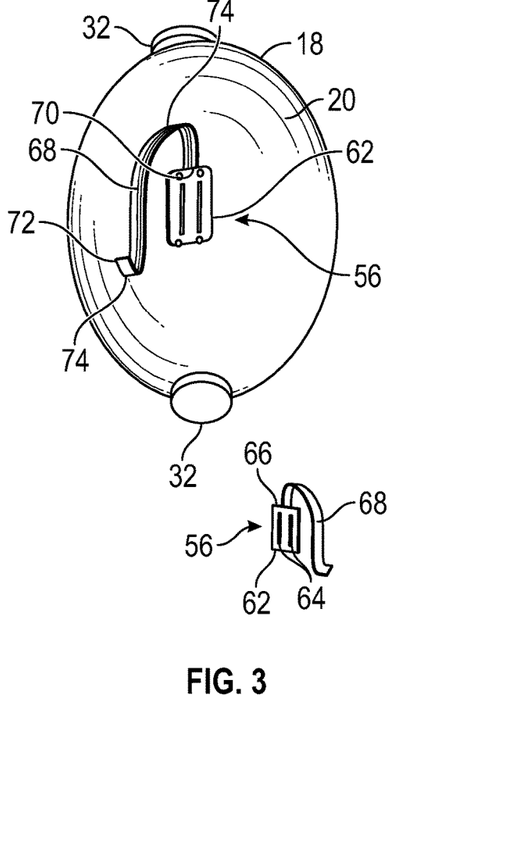
FIG. 3 is a back view of sensing unit and a clip of an embodiment of the disclosure.

Each of the sensing units 12 includes a power button 28 that is movably integrated into the outer wall 20 of the housing 18 and the power button 28 is electrically coupled to the control circuit 24 for turning the control circuit 24 on and off. The power button 28 is hermetically sealed with the outer wall 20 of the housing 18 thereby inhibiting moisture from entering the housing 18 around the power button 28. Each of the sensing units 12 includes a power supply 25 that is positioned within the housing 18, the power supply 25 is electrically coupled to the control circuit 24 and the power supply 25 comprises a rechargeable battery 27. Additionally, each of the sensing units 12 includes a charge port 29 that is recessed into the outer wall 20 of the housing 18 to receive a charge cord 30. The charge port 29 is electrically coupled to the rechargeable battery 17 for charging the rechargeable battery 27. A plurality of covers 32 is each movably integrated into the outer wall 20 of the housing 18. Each of the covers 32 is positionable over a respective one of the input port 16 and the charge port 29 such that the covers 32 form a fluid impermeable seal with the housing 18 to protect the input port 16 and the charge port 29 from moisture.

Figure 2:
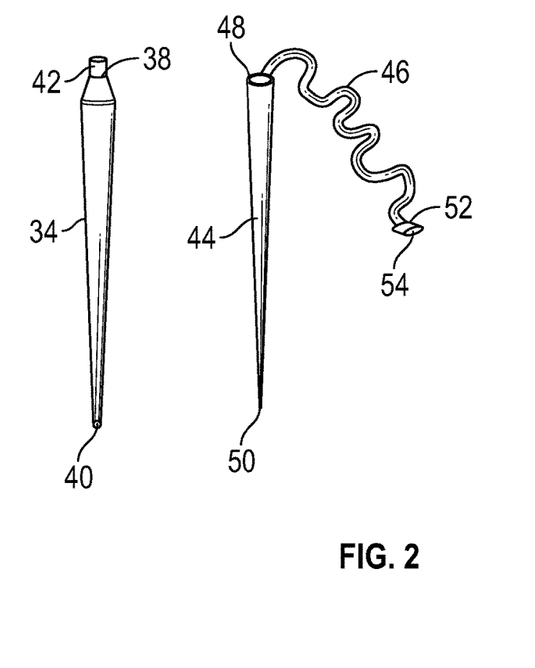
FIG. 2 is a perspective view of a first temperature sensor and a second temperature sensor of an embodiment of the disclosure.
Figure 4:
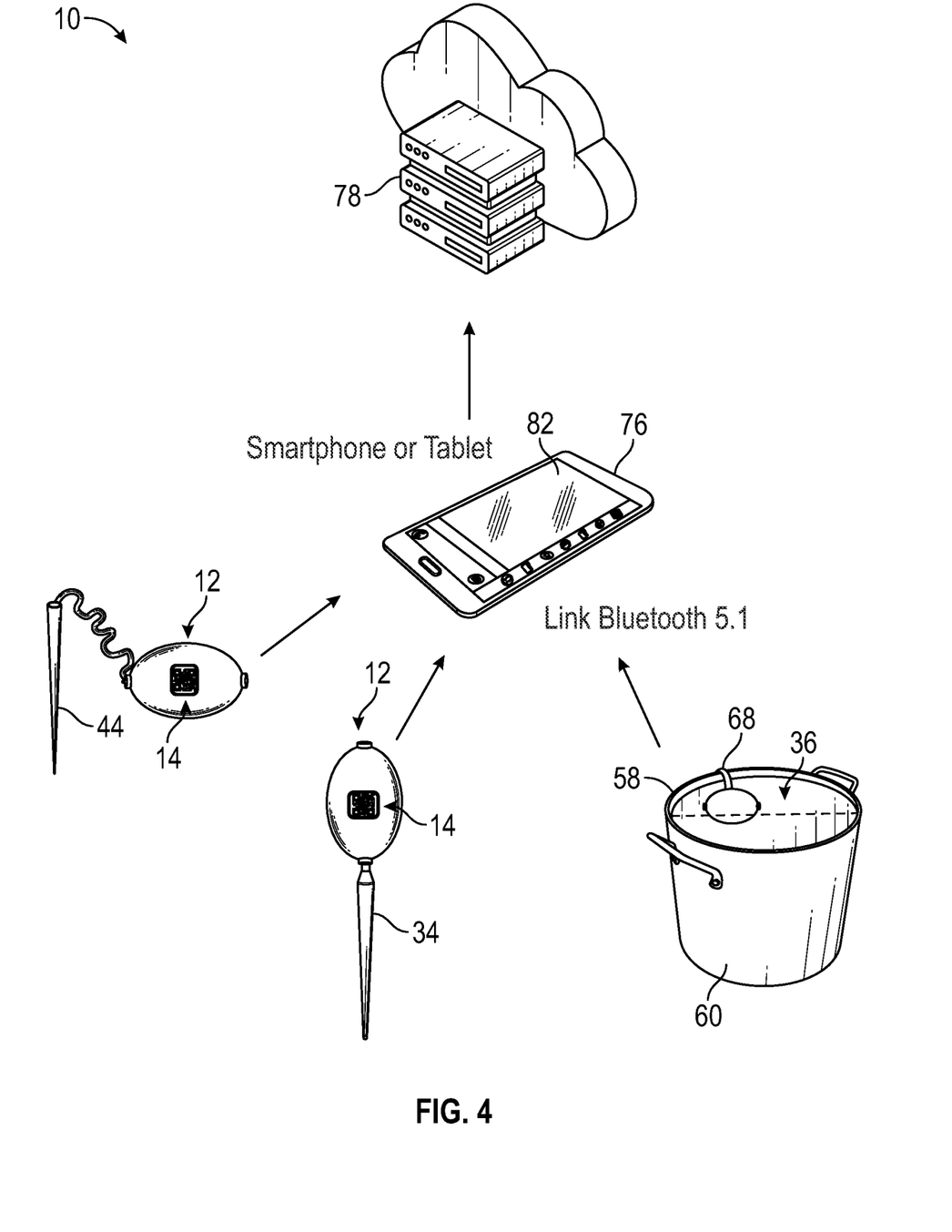
FIG. 4 is a perspective view of a temperature monitoring assembly according to an embodiment of the disclosure.
Figure 5:
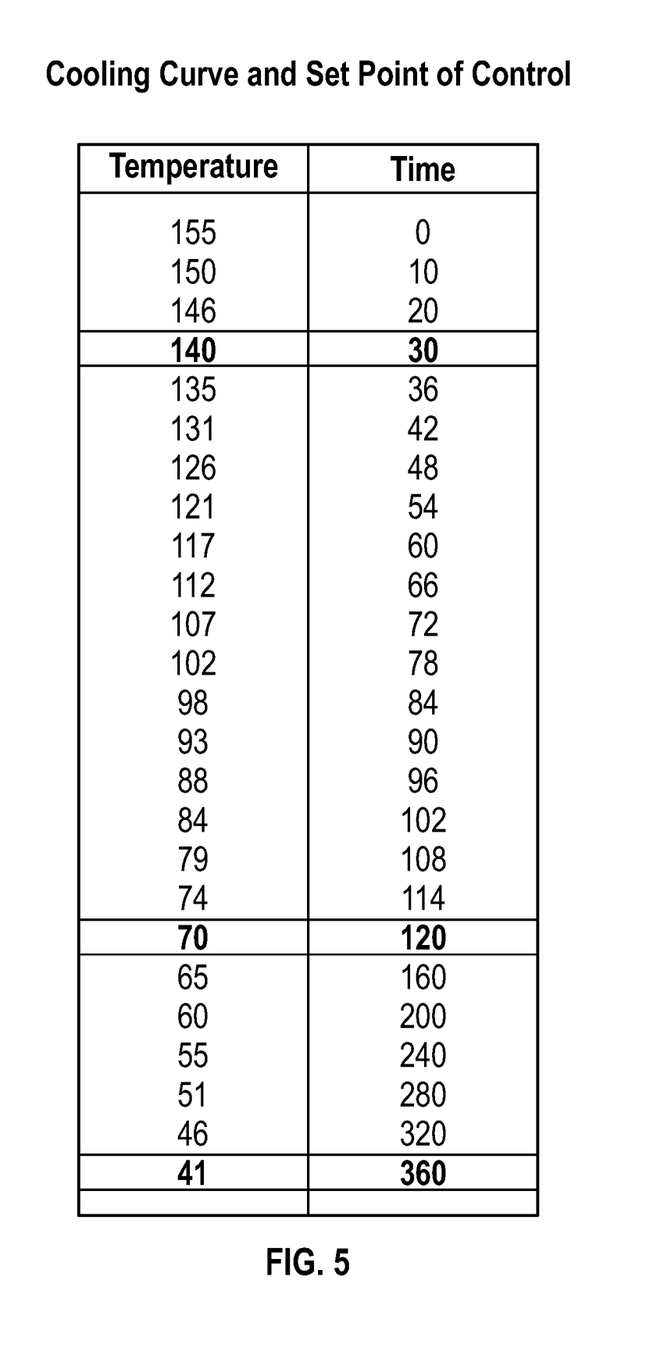
FIG. 5 is a chart view of an embodiment of the disclosure.
Figure 6:
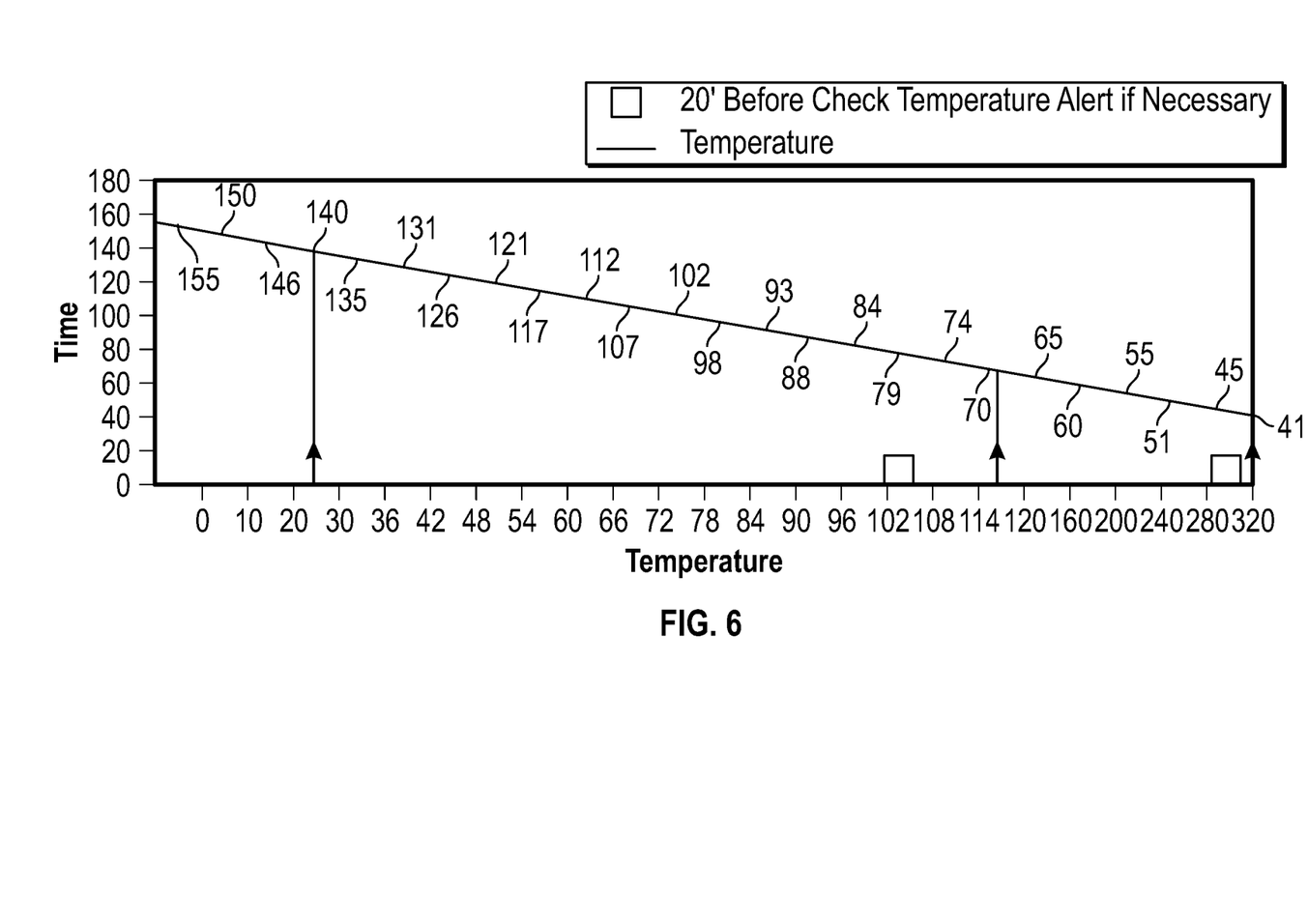
FIG. 6 is a graph view of an embodiment of the disclosure.
Figure 7:
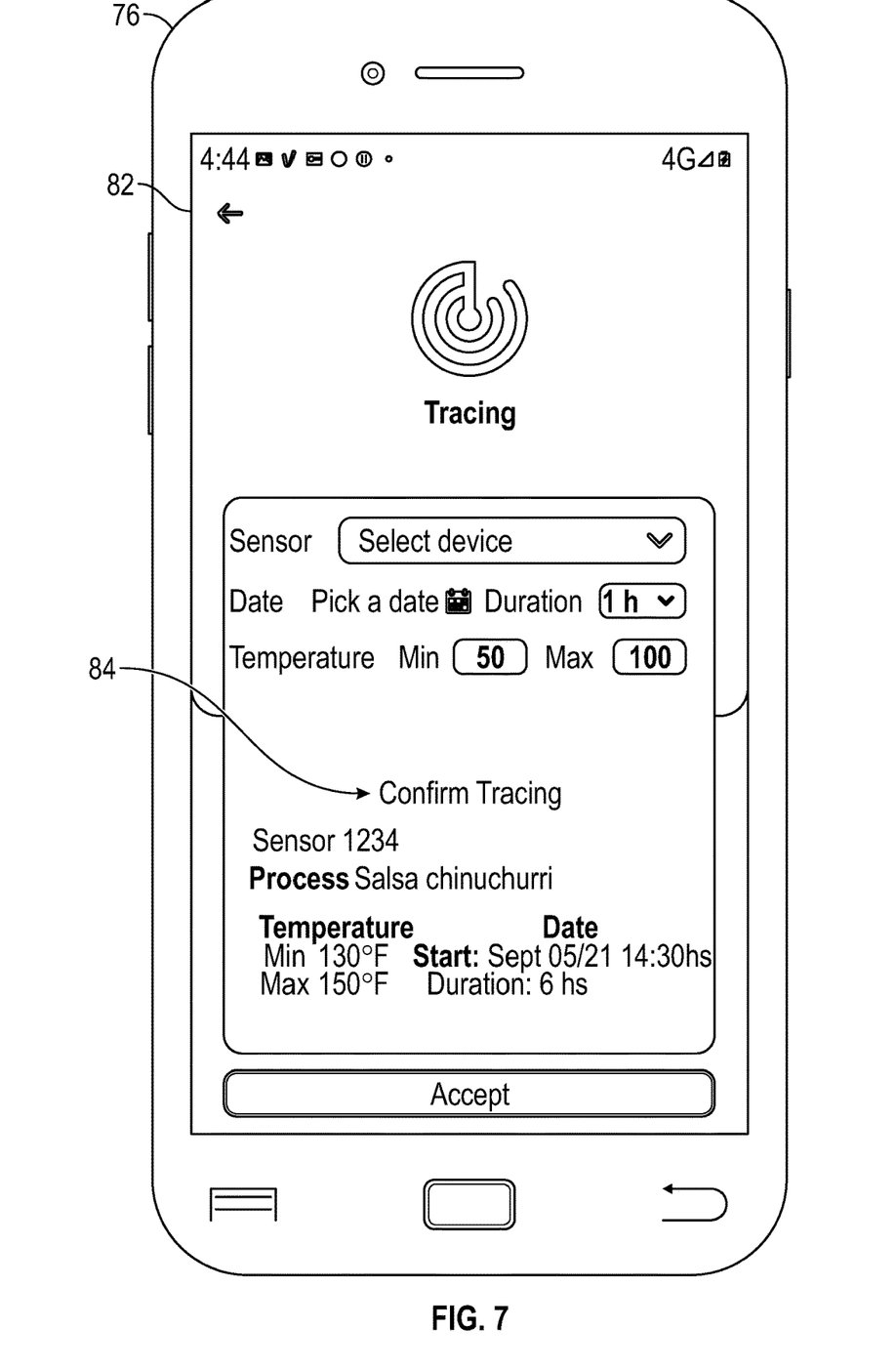
FIG. 7 is a front view of a personal electronic device an embodiment of the disclosure showing a menu screen.
Figure 8:
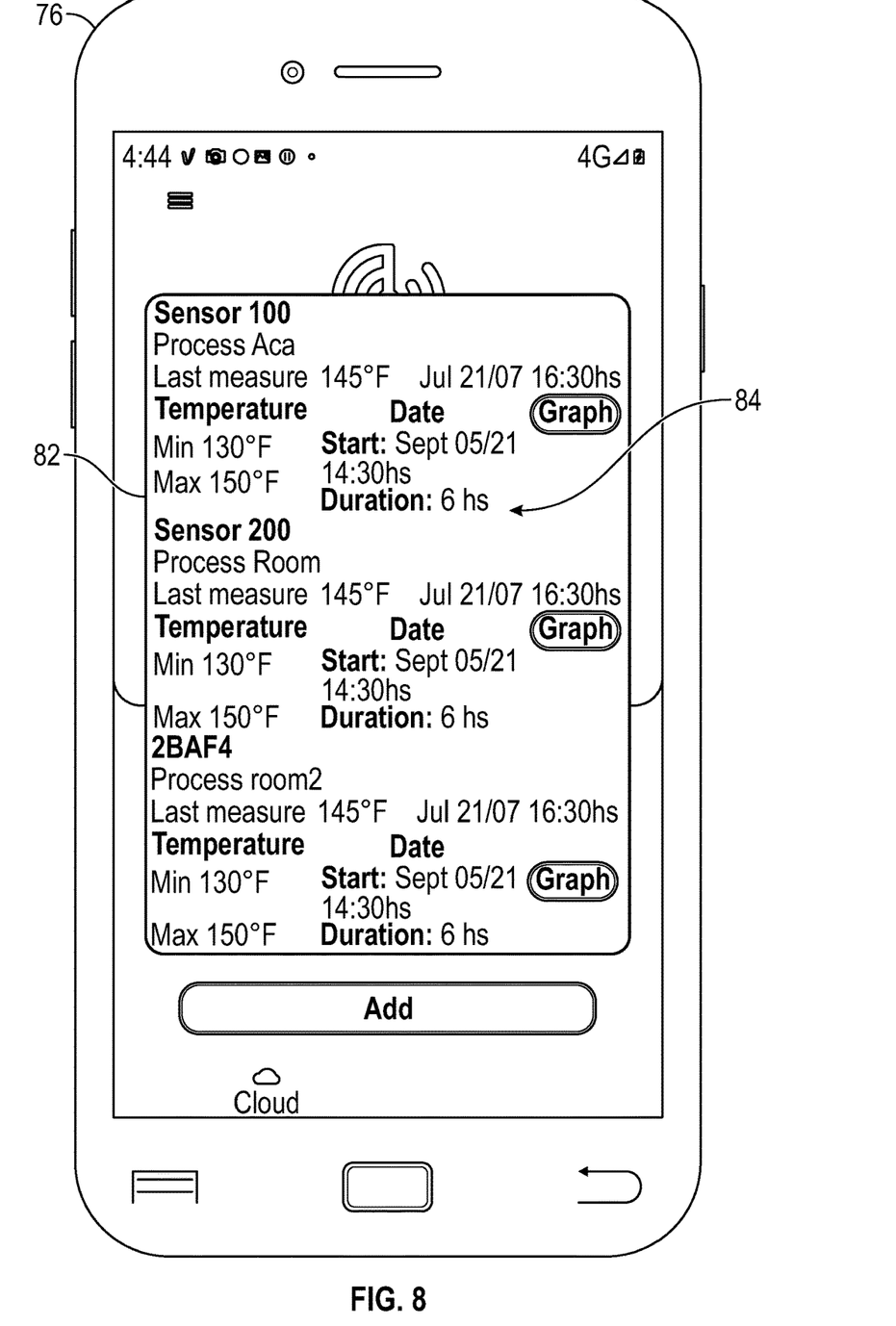
FIG. 8 is a front view of a personal electronic device an embodiment of the disclosure showing a data screen.
Figure 9:
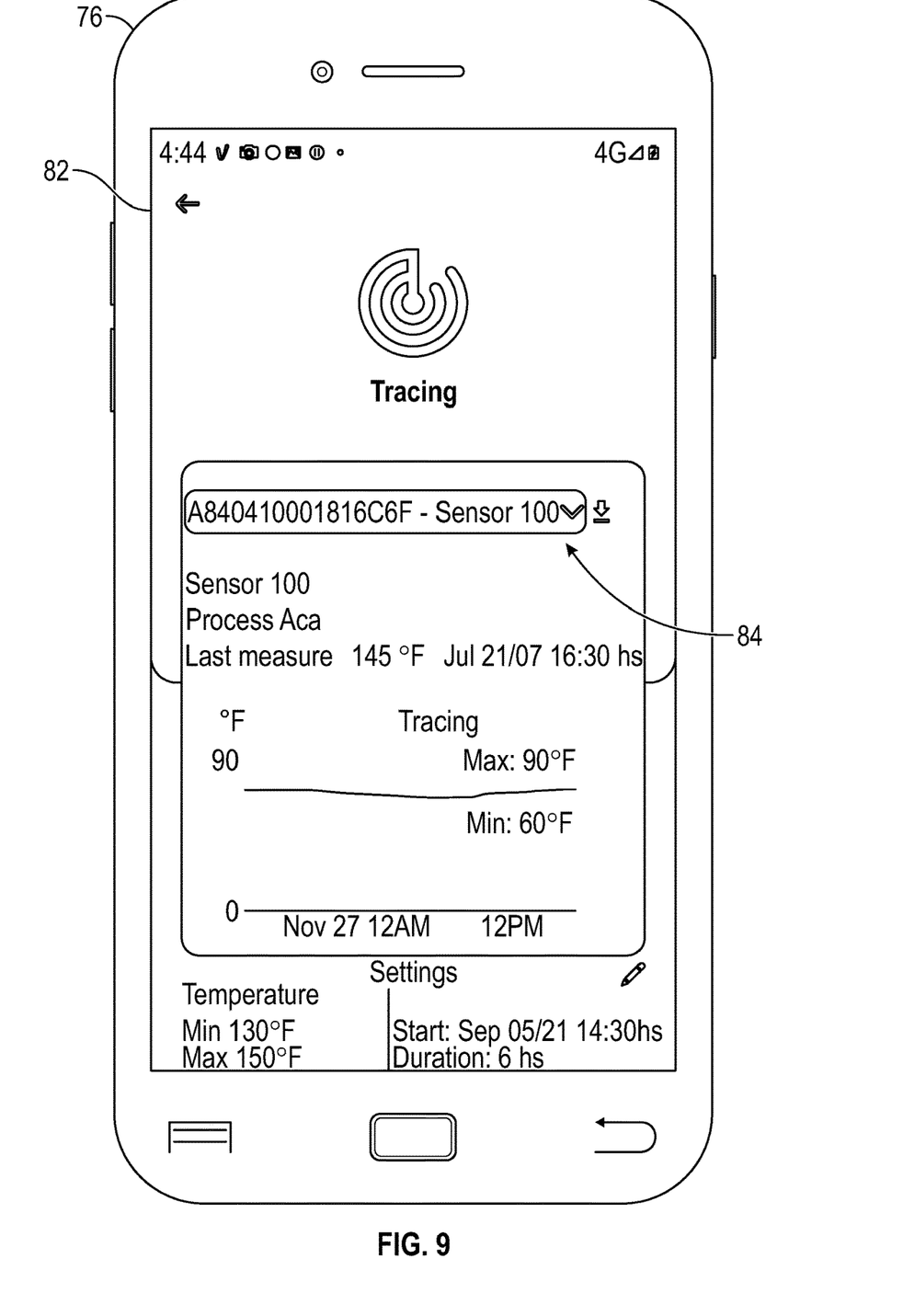
FIG. 9 is a front view of a personal electronic device an embodiment of the disclosure showing a graph screen.

A first temperature sensor 34 is provided and the first temperature sensor 34 is pluggable into the input port 16 on a respective one of the sensing units 12. The respective sensing unit 12 is positionable in a fluid food item 36 such that the first temperature sensor 34 is in thermal communication with the fluid food item 36 to sense the temperature of the food item 36. Additionally, the data signal broadcast by the respective sensing unit 12 includes a temperature sensed by the first temperature sensor 34. The first temperature sensor 34 may comprise an electronic temperature probe that can detect temperatures ranging between approximately 0.0 degrees Fahrenheit and 350.0 degrees Fahrenheit.

The first temperature sensor 34 has a top end 38 and a bottom end 40, and the first temperature sensor 34 tapers to a point between the top end 38 and the bottom end 40. The first temperature sensor 34 has a first data plug 42 that is integrated into the top end 38. The first data plug 42 is electrically matable to the input port 16 on the housing 18 of the respective sensing unit 12 such that the first temperature sensor 34 is in electrical communication with the control circuit 24 associated with the respective sensing unit 12. The first data plug 42 may comprise a universal serial bus plug or other type of data plug 54 that is matable to the input port 16.

A second temperature sensor 44 is provided which has a data cord 46 and the data cord 46 is pluggable into the input port 16 on a respective one of the sensing units 12. In this way the respective sensing unit 12 can remotely positioned with respect to a solid food item 36 in which the second temperature sensor 44 is inserted. The solid food item 36 may be meat or other type of non-fluid food item. The second temperature sensor 44 is in thermal communication with the solid food item 36 to sense the temperature of the solid food item 36.

The second temperature sensor 44 has an upper end 48 and lower end 50, and the second temperature sensor 44 tapers to a point between the upper end 48 and the lower end 50. The data cord 46 extends away from the upper end 48 and the data cord 46 has a distal end 52 with respect to the upper end 48. The data cord 46 has a data plug 54 that is electrically coupled to the distal end 52 of the data cord 46. The data plug 54 is electrically matable to the input port 16 on the respective sensing unit 12 such that the second temperature sensor 44 is electrically coupled to the control circuit 24 associated with the respective sensing unit 12. The data plug 54 may comprise a universal serial bus plug or other type of data plug 54 that is matable to the input port 16.

A clip 56 is provided and the clip 56 is removably attachable to a respective one of the sensing units 12. The clip 56 engages an upper edge 58 of a cooking pot 60 for suspending the respective sensing unit 12 from the upper edge 58 of the cooking pot 60 thereby facilitating the first temperature sensor 34 to extend downwardly into a food item 36 in the cooking pot 60. The clip 56 comprises a mating member 62 that has a first surface 64 and an outer edge 66, and the first surface 64 releasably engages the outer wall of the housing 18 associated with a respective one of the sensing units 12. The mating member 62 may be magnetic for magnetically engaging the outer wall 20 of the housing 18, the first surface 64 may comprise a multiple use adhesive to adhesively engage the outer wall 20 of the housing 18. Furthermore, the outer wall 20 of the housing 18 may have an engagement point that the mating member 62 can releasably engage.

The clip 56 includes an engaging member 68 that has a first end 70 and a second end 72, and the engaging member 68 is elongated between the first end 70 and the second end 72. The first end 70 is coupled to the outer edge 66 of the mating member 62 and the engaging member 68 has a series of curves 74 that are distributed between the first end 70 and the second end 72 such that the engaging member 68 has an S-shape. A respective one of the curves 74 receives the upper edge 58 of the cooking pot 60 having the housing 18 positioned inside of the cooking pot 60 and having the engaging member 68 extending downwardly along an outside of the cooking pot 60.

A personal electronic device 76 is included and the personal electronic device 76 stores a temperature analysis program. The personal electronic device 76 is in remote communication with the sensing units 12 such that the personal electronic device 76 receives the data signal broadcast by each of the sensing units 12 and the personal electronic device 76 is in remote communication with an extrinsic data storage device 78. The extrinsic data storage device 78 may comprise a cloud server, for example, or other type of data storage device that can be accessed via the internet, for example, or other type of wireless communication network. Furthermore, the extrinsic data storage device 78 stores the data recorded by each of the sensing units 12 thereby facilitating the data to be subsequently analyzed.

The personal electronic device 76 displays temperature data corresponding to each of the sensing units 12 and the temperature data is arranged according to the unique identification of the sensing units 12. In this way the personal electronic device 76 facilitates a user to remotely monitor the temperature of the food items 36 that each of the sensing units 12 is measuring. The user may be an employee of a restaurant or other food service facility and the food items 36 may be food items 36 that have been placed in refrigeration after the food items 36 have been cooked. As is most clearly shown in FIG. 8, the temperature data might include the identity of the sensing unit, the temperature recorded, the time the temperature was recorded, the date the temperature was recorded, a range of temperatures that were recorded and other data that is pertinent to ensure that the food items 36 conform to food safety regulations that apply to public restaurants. As is most clearly shown in FIG. 7, the temperature analysis program may display a control menu that facilitates the duration of temperature measurement to be input, the duration of the temperature measurement to be input, the type of food item to be input and other parameters of temperature analysis that are pertinent to tracking the cooling rate of the food items 36 that are being monitored.

The temperature analysis program analyzes the temperature data that is broadcast in the data signal thereby facilitating the personal electronic device 76 to display a temperature analysis in a graphical form. In this way the personal electronic device 76 facilitates the user to verify that the temperature of the food items 36 is decreasing in accordance with food safety guidelines. As is most clearly shown in FIG. 6, the graphical form may include a graph displaying the temperature of the food item 36 over a duration of time. Furthermore, alert points might be assigned that correspond to critical temperatures that the food item 36 should have cooled to at a specific time. The personal electronic device 76 may emit an audible alert if the food item 36 has not cooled to the critical temperature thereby facilitating the user to take appropriate action to ensure the food item 36 conforms to food safety regulations.

The personal electronic device 76 includes a transceiver 80 and a display 82. The transceiver 80 is in wireless communication with the transmitter 26 associated with each of the sensing units 12. The display 82 displays indicia 84 comprising graphs and charts generated by the temperature analysis program. The transceiver 80 may comprise a radio frequency transceiver or the like and the transceiver 80 may employ Bluetooth communication protocols. Additionally, the display 82 may comprise a liquid crystal display or other type of electronic display that is common to smart phones.

In use, the bar code 14 on each of the sensing units 12 is scanned into the personal electronic device 76 and either the first temperature sensor 34 or the second temperature sensor 44 is attached to the respective sensing units 12, depending on the type of food item 36 that is to be monitored. Furthermore, the personal electronic device 76 is synched whichever of the first temperature sensor 34 or the second temperature sensor 44 that is attached to the sensing units 12. In this way the personal electronic device 76 receives the temperature data thereby facilitating the temperature analysis program to analyze the temperature data. In this way the user can remotely monitor the food items 36 that have been placed in refrigeration for storage. Furthermore, the user can ensure that the food items 36 are cooling in accordance with food service guidelines to ensure that the food items 36 are conforming to food safety guidelines that apply to restaurants and other food service facilities. In this way a single user can monitor a plurality of food items 36 and the user can be alerted, if need be, to intervene if the food items 36 are not cooling in accordance with the food service guidelines.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A temperature monitoring assembly for monitoring the temperature of foods being stored in a refrigerated environment, said assembly comprising:
    a plurality of sensing units, each of said sensing units being assigned a unique identification with respect to each other, each of said sensing units having a bar code being printed on an outside of said sensing units which corresponds to said unique identification, each said sensing units having an input port, each of said sensing units being configured to broadcast a data signal;
    a first temperature sensor being pluggable into said input port on a respective one of said sensing units, said respective sensing unit being positionable in a fluid food item such that said first temperature sensor is in thermal communication with the fluid food item wherein said first temperature sensor is configured to sense the temperature of the food item, said data signal broadcast by said respective sensing unit including a temperature sensed by said first temperature sensor;
    a second temperature sensor having a data cord, said data cord being pluggable into said input port on a respective one of said sensing units to facilitate said respective sensing unit to be remotely positioned with respect to a solid food item in which said second temperature sensor is inserted, said second temperature sensor being in thermal communication with the solid food item wherein said second temperature sensor is configured to sense the temperature of the solid food item;

a clip being removably attachable to a respective one of said sensing units, said clip being engaged to an upper edge of a cooking pot for suspending said respective sensing unit from the upper edge of the cooking pot to facilitate said first temperature sensor to extend downwardly into a food item in the cooking pot; and a personal electronic device storing a temperature analysis program, said personal electronic device being in remote communication with said sensing units such that said personal electronic device is configured to receive said data signal broadcast by each of said sensing units, said personal electronic device being in remote communication with an extrinsic data storage device, said personal electronic device being configured to display temperature data corresponding to each of said sensing units, said temperature data being arranged according to said unique identification of said sensing units wherein said personal electronic device is configured to facilitate a user to remotely monitor the temperature of the food items that each of said sensing units is measuring.

2. The assembly according to claim 1, wherein each of said sensing units comprises:
a housing having an outer wall, said outer wall being continuously arcuate about a central axis of said housing such that said housing has a rounded shape, said housing being elongated along said central axis such that said housing has an ovoid shape, said bar code being printed on an outer surface of said outer wall, said input port being integrated into said outer wall;
a control circuit being positioned within said housing, said control circuit being electrically coupled to said input port;
a transmitter being positioned within said housing, said transmitter being electrically coupled to said control circuit, said transmitter being configured to broadcast said data signal;
a power button being movably integrated into said outer wall of said housing, said power button being electrically coupled to said control circuit for turning said control circuit on and off, said power button being hermetically sealed with said outer wall of said housing thereby inhibiting moisture from entering said housing around said power button;
a power supply being positioned within said housing, said power supply being electrically coupled to said control circuit, said power supply comprising a rechargeable battery; and
a charge port being recessed into said outer wall of said housing wherein said charge port is configured to receive a charge cord, said charge port being electrically coupled to said rechargeable battery for charging said rechargeable battery.

3. The assembly according to claim 2, wherein said housing has a plurality of covers each being movably integrated into said outer wall of said housing, each of said covers being positionable over a respective one of said input port and said charge port such that said covers forms a fluid impermeable seal with said housing to protect said input port and said charge port from moisture.

4. The assembly according to claim 2, wherein said first temperature sensor having a top end and a bottom end, said first temperature sensor tapering to a point between said top end and said bottom end, said first temperature sensor having a first data plug being integrated into said top end, said first data plug being electrically matable to said input port on said housing of said respective sensing unit such that said first temperature sensor is in electrical communication with said control circuit associated with said respective sensing unit.

5. The assembly according to claim 2, wherein said second temperature sensor has an upper end and lower end, said second temperature sensor tapering to a point between said upper end and said lower end, said data cord extending away from said upper end, said data cord having a distal end with respect to said upper end, said data cord having a data plug being electrically coupled to said distal end of said data cord, said data plug being electrically matable to said input port on said respective sensing unit such that said second temperature sensor is electrically coupled to said control circuit associated with said respective sensing unit.

6. The assembly according to claim 2, wherein said clip comprises:
a mating member having a first surface and an outer edge, said first surface being releasably engaged to said outer wall of said housing associated with a respective one of said sensing units; and
an engaging member having a first end and a second end, said engaging member being elongated between said first end and said second end, said first end being coupled to said outer edge of said mating member, said engaging member having a series of curves being distributed between said first end and said second end such that said engaging member has an S-shape, a respective one of said curves being configured to receive the upper edge of the cooking pot having said housing being positioned inside of the cooking pot and having said engaging member extending downwardly along an outside of the cooking pot.

7. The assembly according to claim 2, wherein:
said temperature analysis program analyzes temperature data broadcast in said data signal to facilitate said personal electronic device to display a temperature analysis in a graphical form wherein said personal electronic device is configured to facilitate the user to verify that the temperature of the food items is decreasing in accordance with food safety guidelines; and
said personal electronic device includes a transceiver and a display, said transceiver being in wireless communication with said receiver associated with each of said sensing units, said display being configured to display indicia comprising graphs and charts generated by said temperature analysis program.

8. A temperature monitoring assembly for monitoring the temperature of foods being stored in a refrigerated environment, said assembly comprising:
a plurality of sensing units, each of said sensing units being assigned a unique identification with respect to each other, each of said sensing units having a bar code being printed on an outside of said sensing units which corresponds to said unique identification, each said sensing units having an input port, each of said sensing units being configured to broadcast a data signal, each of said sensing units comprising:
a housing having an outer wall, said outer wall being continuously arcuate about a central axis of said housing such that said housing has a rounded shape, said housing being elongated along said central axis such that said housing has an ovoid shape, said bar code being printed on an outer surface of said outer wall, said input port being integrated into said outer wall;

a control circuit being positioned within said housing, said control circuit being electrically coupled to said input port;

a transmitter being positioned within said housing, said transmitter being electrically coupled to said control circuit, said transmitter being configured to broadcast said data signal;

a power button being movably integrated into said outer wall of said housing, said power button being electrically coupled to said control circuit for turning said control circuit on and off, said power button being hermetically sealed with said outer wall of said housing thereby inhibiting moisture from entering said housing around said power button;

a power supply being positioned within said housing, said power supply being electrically coupled to said control circuit, said power supply comprising a rechargeable battery;

a charge port being recessed into said outer wall of said housing wherein said charge port is configured to receive a charge cord, said charge port being electrically coupled to said rechargeable battery for charging said rechargeable battery; and a plurality of covers, each of said covers being movably integrated into said outer wall of said housing, each of said covers being positionable over a respective one of said input port and said charge port such that said covers forms a fluid impermeable seal with said housing to protect said input port and said charge port from moisture;

a first temperature sensor being pluggable into said input port on a respective one of said sensing units, said respective sensing unit being positionable in a fluid food item such that said first temperature sensor is in thermal communication with the fluid food item wherein said first temperature sensor is configured to sense the temperature of the food item, said data signal broadcast by said respective sensing unit including a temperature sensed by said first temperature sensor, said first temperature sensor having a top end and a bottom end, said first temperature sensor tapering to a point between said top end and said bottom end, said first temperature sensor having a first data plug being integrated into said top end, said first data plug being electrically matable to said input port on said housing of said respective sensing unit such that said first temperature sensor is in electrical communication with said control circuit associated with said respective sensing unit;

a second temperature sensor having a data cord, said data cord being pluggable into said input port on a respective one of said sensing units to facilitate said respective sensing unit to be remotely positioned with respect to a solid food item in which said second temperature sensor is inserted, said second temperature sensor being in thermal communication with the solid food item wherein said second temperature sensor is configured to sense the temperature of the solid food item, said second temperature sensor having an upper end and lower end, said second temperature sensor tapering to a point between said upper end and said lower end, said data cord extending away from said upper end, said data cord having a distal end with respect to said upper end, said data cord having a data plug being electrically coupled to said distal end of said data cord, said data plug being electrically matable to said input port on said respective sensing unit such that said second temperature sensor is electrically coupled to said control circuit associated with said respective sensing unit;

a clip being removably attachable to a respective one of said sensing units, said clip being engaged to an upper edge of a cooking pot for suspending said respective sensing unit from the upper edge of the cooking pot to facilitate said first temperature sensor to extend downwardly into a food item in the cooking pot, said clip comprising:

a mating member having a first surface and an outer edge, said first surface being releasably engaged to said outer wall of said housing associated with a respective one of said sensing units;

an engaging member having a first end and a second end, said engaging member being elongated between said first end and said second end, said first end being coupled to said outer edge of said mating member, said engaging member having a series of curves being distributed between said first end and said second end such that said engaging member has an S-shape, a respective one of said curves being configured to receive the upper edge of the cooking pot having said housing being positioned inside of the cooking pot and having said engaging member extending downwardly along an outside of the cooking pot; and a personal electronic device storing a temperature analysis program, said personal electronic device being in remote communication with said sensing units such that said personal electronic device is configured to receive said data signal broadcast by each of said sensing units, said personal electronic device being in remote communication with an extrinsic data storage device, said personal electronic device being configured to display temperature data corresponding to each of said sensing units, said temperature data being arranged according to said unique identification of said sensing units wherein said personal electronic device is configured to facilitate a user to remotely monitor the temperature of the food items that each of said sensing units is measuring, said temperature analysis program analyzing temperature data broadcast in said data signal to facilitate said personal electronic device to display a temperature analysis in a graphical form wherein said personal electronic device is configured to facilitate the user to verify that the temperature of the food items is decreasing in accordance with food safety guidelines, said personal electronic device including a transceiver and a display, said transceiver being in wireless communication with said receiver associated with each of said sensing units, said display being configured to display indicia comprising graphs and charts generated by said temperature analysis program.

* * * * *